United States Patent [19]

Brand

[11] Patent Number: 4,611,774

[45] Date of Patent: Sep. 16, 1986

[54] PROPELLER DRIVE ASSEMBLY

[76] Inventor: Rolf Brand, 212 N. Mecklenburg Ave., South Hill, Va. 23970

[21] Appl. No.: 608,670

[22] Filed: May 10, 1984

Related U.S. Application Data

[63] Continuation-in-part of Ser. No. 403,697, Jul. 30, 1982, Pat. No. 4,500,053.

[51] Int. Cl.[4] .................................................. B64C 1/16
[52] U.S. Cl. ........................................ 244/54; 244/13; 244/60; 244/65; 244DIG. 14; 384/119
[58] Field of Search .................... 244/DIG. 1, 16, 13, 244/54, 65; 416/134 R, 134 A; 308/184 R, 189 R, 207 R, 206; 384/535, 536, 581, 582, 215, 220, 222, 223, 249; 403/370, 374; 464/160, 161

[56] References Cited

U.S. PATENT DOCUMENTS

| 899,350 | 9/1908 | Steinhaus | 244/DIG. 1 |
|---|---|---|---|
| 1,038,633 | 9/1912 | O'Bryan | 244/DIG. 1 |
| 1,820,442 | 8/1931 | Cooper | 404/161 |
| 2,340,503 | 2/1944 | Bareni | 308/26 |
| 2,608,451 | 8/1952 | Pierce, Jr. | 308/184 |
| 3,013,749 | 12/1961 | Dunham | 244/65 |
| 3,182,986 | 5/1965 | Brockman | 267/1 |
| 3,590,652 | 7/1971 | Strang | 74/421 |
| 3,649,054 | 3/1972 | McClenan | 258/158 |
| 3,726,109 | 4/1973 | Mortensen | 64/30 A |
| 4,249,711 | 2/1981 | Godbersen | 244/54 |

FOREIGN PATENT DOCUMENTS

| 421136 | 2/1911 | France | 244/DIG. 1 |
|---|---|---|---|
| 716192 | 12/1931 | France | 244/DIG. 1 |

*Primary Examiner*—Galen Barefoot
*Attorney, Agent, or Firm*—Lalos, Keegan & Kaye

[57] ABSTRACT

An assembly for mounting a propeller, which is driven by an aircraft engine, on a longitudinal member of a lightweight aircraft. The assembly includes a sleeve positioned about the longitudinal member, and a pair of opposed adjustable cups securing the sleeve at its ends longitudinally relative to the longitudinal member. A rotating mechanism mounted to the propeller, rotatable about the sleeve, and driven by the aircraft engine rotates the propeller concentrically about a longitudinal axis of the longitudinal member. Suitable bearings are disposed between the rotating mechanism and the sleeve and the rotating mechanism rotates on these bearings. Vibration dampening rings are placed between the cups and the sleeve and dampen the vibration transmitted between the rotating mechanism and the longitudinal member.

21 Claims, 10 Drawing Figures

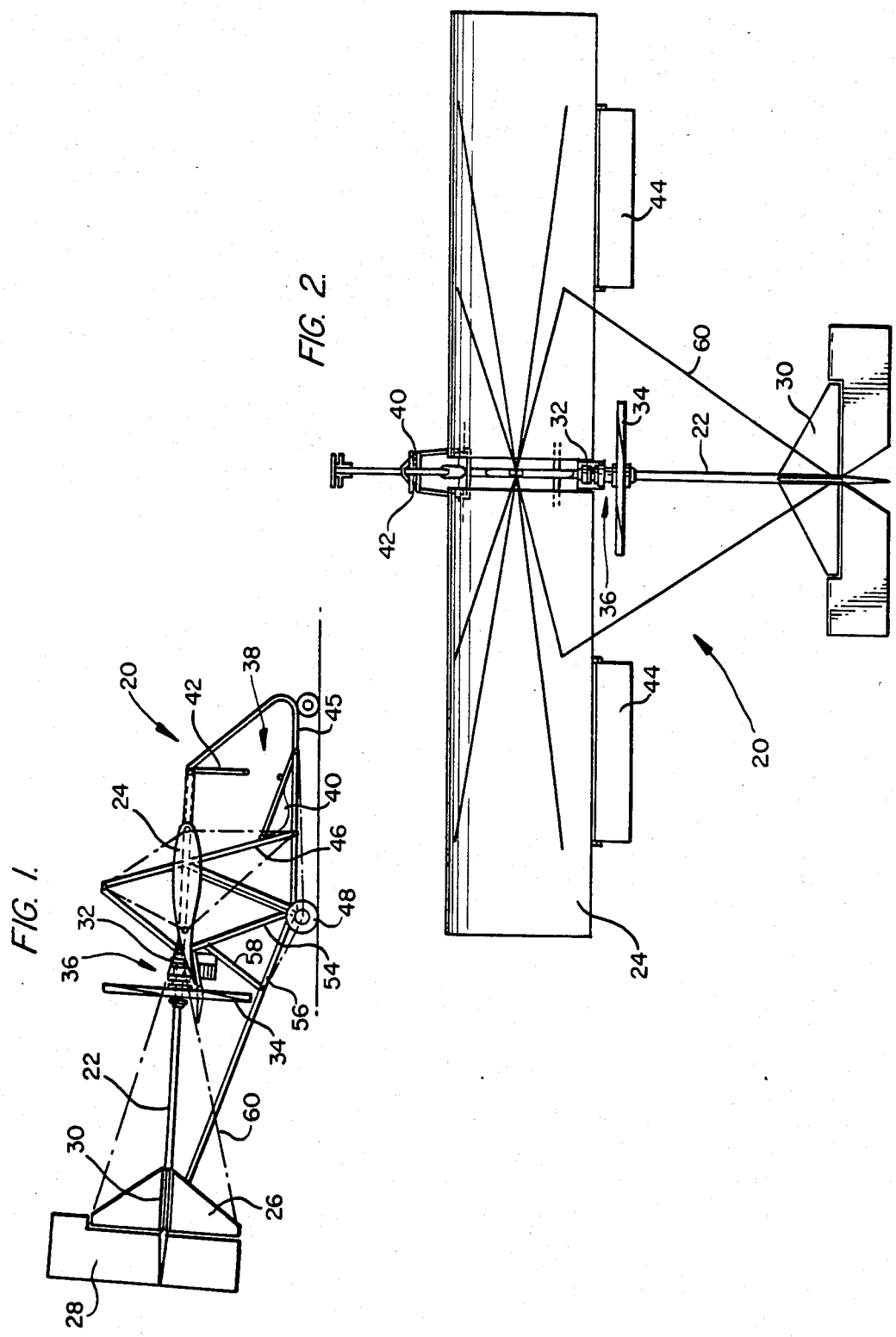

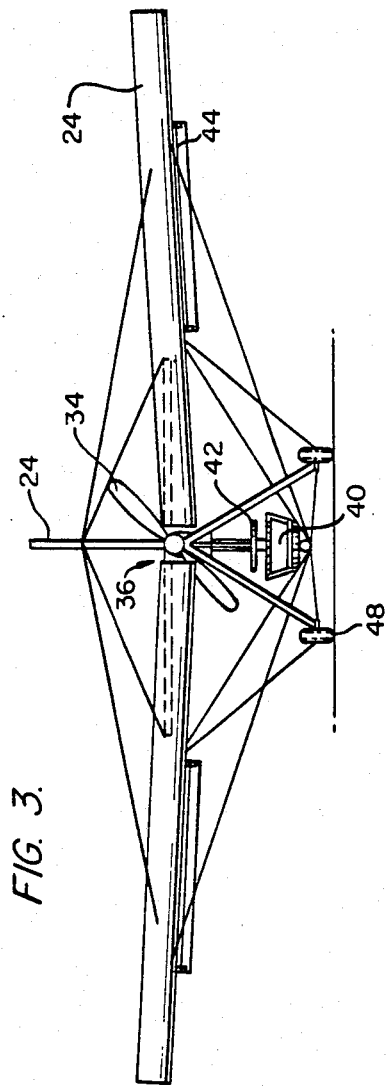
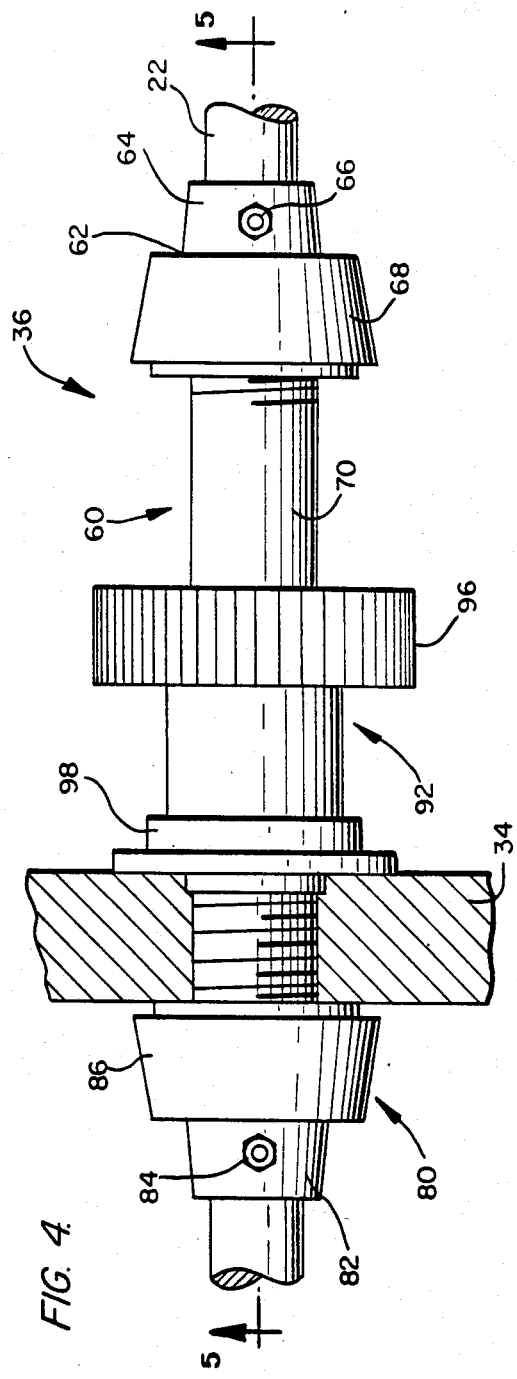
FIG. 3.
FIG. 4.

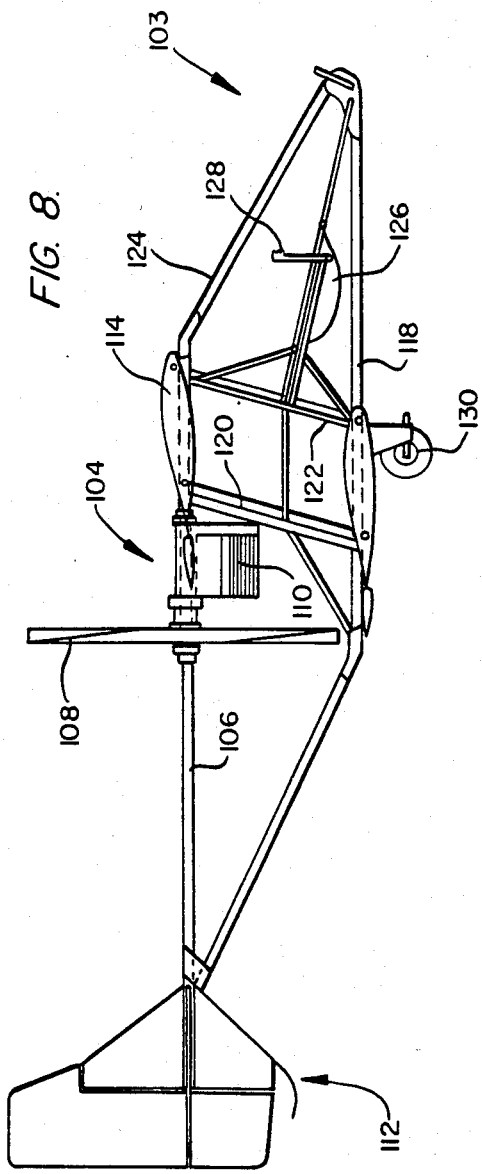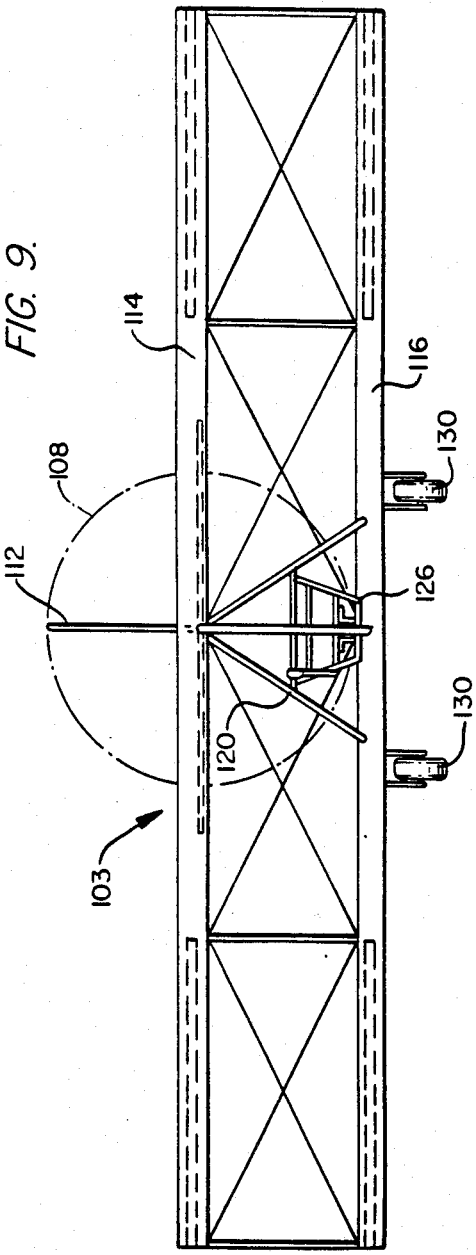

PROPELLER DRIVE ASSEMBLY

BACKGROUND OF THE INVENTION

The present application is a continuation-in-part of Applicant's copending application, Ser. No. 403,697, filed July 30, 1982, now U.S. Pat. No. 4,500,053.

The present invention relates to lightweight aircraft and more particularly to ultralightweight aircraft. It further relates to a novel mounting system for the propeller of such an aircraft.

This invention is an improvement over Applicant's U.S. Pat. No. 4,382,566, issued May 10, 1983, the disclosure of which is hereby incorporated by reference in its entirety. That patent shows a novel aircraft design in which the propellers are positioned between the wing structure and the tail rudder and elevator assembly and mounted for rotation about the principal longitudinal load-carrying structural member. This is an aerodynamically sound and lightweight design, which does not require additional structure for the prime mover separate from the principal longitudinal member. Additional structure can add undesirable additional weight and cost to an ultralightweight aircraft. It is further necessary that the propeller be so mounted as to minimize vibrational effect on the structural members. In addition to weakening these members and possibly damaging the propeller and engine, these vibrations can be distracting to the pilot of the aircraft or, at the least, be discomforting. The mounting system further should be simple of manufacture and easy to assemble. This is particularly important as these ultralightweight aircraft frequently are manufactured and sold in kit form, thus necessitating a design which is easy for the layman to assemble and disassemble. Further, the design should be such that the propeller and/or the engine can be easily removed for repair or replacement. It is also desireable that the mounting system be able to be securely attached to the longitudinal member.

OBJECTS OF THE INVENTION

Accordingly, it is the principal object of the present invention to provide an improved lightweight or ultralightweight aircraft design.

Another object of the present invention is to provide an improved propeller mounting system for a lightweight aircraft.

A further object of the present invention is to provide an improved lightweight aircraft having a novel adjustable propeller assembly requiring no additional complex mounting structure.

A still further object is to provide an improved propeller mounting system which is easy to manufacture, and easy to assemble and disassemble.

Another object is to provide an improved mounting assembly which can be securely and removably attached to the main longitudinal member of the aircraft.

A further object is to provide an improved engine and propeller mounting system which allows for the easy removal of the propeller for replacement and/or for repair.

A still further object is to provide a propeller mounting system which minimizes the vibrational impact and damage to the aircraft.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 1 is a side elevational view of an aircraft embodying the present invention.

FIG. 2 is a top plan view of the aircraft of FIG. 1.

FIG. 3 is a front elevational view of the aircraft of FIG. 1.

FIG. 4 is a top plan view of the mounting system shown in FIG. 1; for clarity's sake, the mounting system is shown in isolation and the engine is not shown.

FIG. 8 is a side elevational view of another aircraft embodying the present invention.

FIG. 9 is a front elevational view of the aircraft of FIG. 8.

DESCRIPTION OF THE PREFERRED EMBODIMENTS

Figure 5:
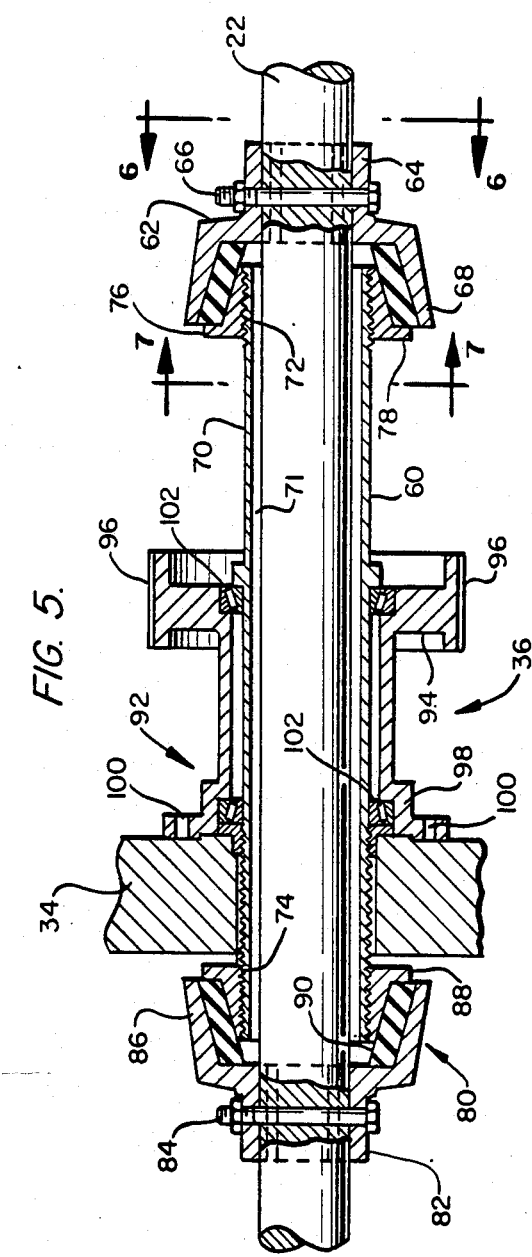
FIG. 5 is a cross-sectional view taken along line 5—5 in FIG. 4.
Figure 7:
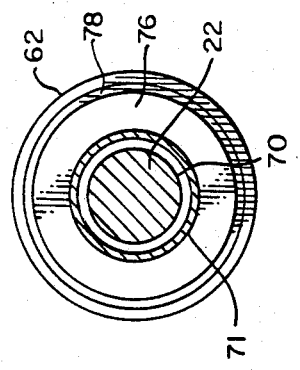
FIG. 7 is a cross-sectional view taken along line 7—7 in FIG. 5.
Figure 6:
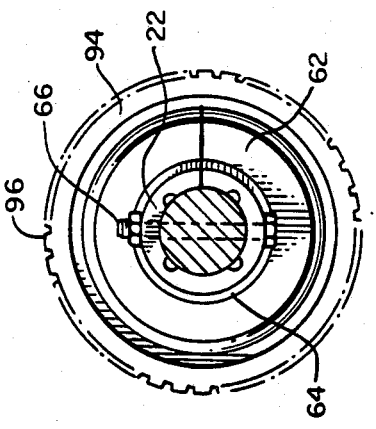
FIG. 6 is a cross-sectional view taken along line 6—6 in FIG. 5.

Referring to FIGS. 1 through 3 of the drawings, there is illustrated a preferred embodiment of the present invention. Generally, this embodiment consists of a lightweight aircraft shown generally at 20 having a longitudinally-disposed, load-carrying structural member or boom 22. A wing assembly 24 is mounted at a forward location of boom 22. The tail fin 26, rudder 28, and elevator assembly 30 are mounted to the aft portion of boom 22. The engine 32 and the propeller 34 are mounted on boom 32 by a mounting system shown generally at 36 between the wing and tail assemblies. However, in the embodiment of FIG. 10 as later described, the engine is mounted on structure separate from the propeller mounting assembly.

The pilot's station is shown generally at 38 and is disposed, as best shown in FIGS. 1 and 3, at a lower forward location of aircraft 20. Pilot's station 38 includes a seat 40 having suitable framing and body support material secured to the framing. Operator's control stick 42 formed in an inverted T-shape is attached at its upper end to boom 22 at its forward tip, and is positioned so that it can be easily operated by the seated pilot. Control stick 42 is operatively connected to flaps 44 of wing structure 24 and to the elevator and tail assembly. The present invention further contemplates that the engine controls can be mounted on control stick 42. Referring to FIG. 1, it is seen that seat 40 is supported by a longitudinal member 45 and by an inclined upright member 46. Wheels 48, 48 are rotatably mounted in a conventional manner at the lower ends of support members 50, 50, and a forward wheel 52 is mounted at the forward end of member 44. Members 54 and 56 provide additional structural support, as does bracing member 58 mounted between them, and suitable guide wires 60 are provided where needed.

One embodiment of mounting system 36 is shown in greater detail in FIGS. 4 through 7. The propeller is rotatably mounted about boom 22 and a space 60 is provided, as shown in FIGS. 4 and 5, in which engine 32 can be mounted by brackets or any other suitable means. The mounting system at its forward location includes an aft facing cup 62 having a forward portion 64 which is shaped to fit snugly against boom 22 and is firmly held thereto by bolt 66. It also includes a larger conical member 68 which is spaced from boom 22. A sleeve 70 is positioned around boom 22 and vibrational dampening material 71 is disposed between them. Sleeve 70 has threaded portions 72 at its forward end at 74 and its aft end. A threaded cup 76 is provided and it can be threaded along threads 72 towards and away from conical member 68. A conical-shaped rubber ring 78 is placed between cup 76 and conical member 68. As cup 76 is threaded towards member 68, ring 78 is placed in compression. This provides for a secure and adjustable attachment of sleeve 70 and thus mounting system 36 to boom 22. It further provides for an adjustable system which can accommodate different manufacturing part tolerances as well as part expansions and wear. Also, rubber ring 78 constitutes a vibrational dampening means, supplementing the vibrational dampening material 71 disposed between sleeve 70 and boom 22. A similar attachment means is found at the aft portion of the mounting system. It includes a cup shown generally at 80 having portion 82 secured to the boom by bolt 84 and a larger conical member 86 spaced from boom 22. A cup 88 having threaded portions adapted to be threaded on threads 74 is positioned about sleeve 70, and a rubber ring 90 is positionable between cup 88 and conical member 86. As described for ring 78, ring 90 is placed in varying compressions depending upon the position of conical member 86, which may be screwed along sleeve 70 until ring 90 has been subjected to the desired pressure and the mounting system is firmly mounted. Ring 90 also provides an additional vibrational dampening means.

However, it is also within the scope of the present invention to omit vibrational dampening material 71 and dimension sleeve 70 so that it fits around boom 22. This allows for the use of a slightly smaller sleeve and thus a smaller propeller and provides for a simpler assembly of the mounting device. It has been found, in this regard, that rubber rings 78 and 90 can provide the necessary vibrational dampening means between the sleeve and the boom.

A driving sleeve shown at 92 is positioned about sleeve 70 between propeller 34 and engine 32. Driving sleeve 92 has a flanged portion 94 which has a grooved surface 96 adapted to engage a belt or similar drive means from the engine. A propeller attachment flange 98 is provided at the end of driving sleeve 92. Bolts or similar connection means 100 fixedly attach propeller 34 to flange 98. Thus, as the engine belt (not shown) engages surface 96 of flanged portion 94 and causes it to rotate about sleeve 70, flange 98 is rotated as well. This causes the propeller mounted thereto to rotate about boom 22, thus propelling aircraft 20. The present invention also provides that driving sleeve 92 is rotatable about roller bearings 102 which are provided with suitable oil seals.

Thus, it is readily seen that the mounting system can be easily constructed by positioning sleeve 70 and vibration dampening material 71 about the proper location of boom 22. Driving sleeve 92 is disposed about sleeve 70. Cups 76 and 88 are threaded onto the ends of sleeve 70, and vibrational dampening rings 78 and 90 are placed forward and aft of cups 76 and 88, respectively. Cups 62 and 80 can be then bolted to the boom. Cups 76 and 88 can be adjusted to obtain the desired fit and compression. The propeller and the engines can likewise be mounted on sleeve 70.

Referring to FIGS. 8 and 9, it is apparent that the mounting system can be used also on a lightweight biplane aircraft shown generally at 103. Briefly, mounting device shown generally at 104 in those figures is mounted to boom 106. Propeller 108 and engine 110 are mounted to mounting device 104 as was done with mounting system 36. A tail structure shown generally at 112 is mounted to the aft end of boom 106. The wing structure comprises a pair of parallel wings 114 and 116, and wing 114 is attached to boom 106 and lower wing 116 is attached to lower boom 118. Struts 120 and 122 provide additional support. The operator's station shown generally at 124 includes an operator's seat 126 and a control stick 128 positioned in front of seat 126. Wheels 130, 130 are rotatably mounted in a conventional manner underneath lightweight aircraft 103.

Figure 10:
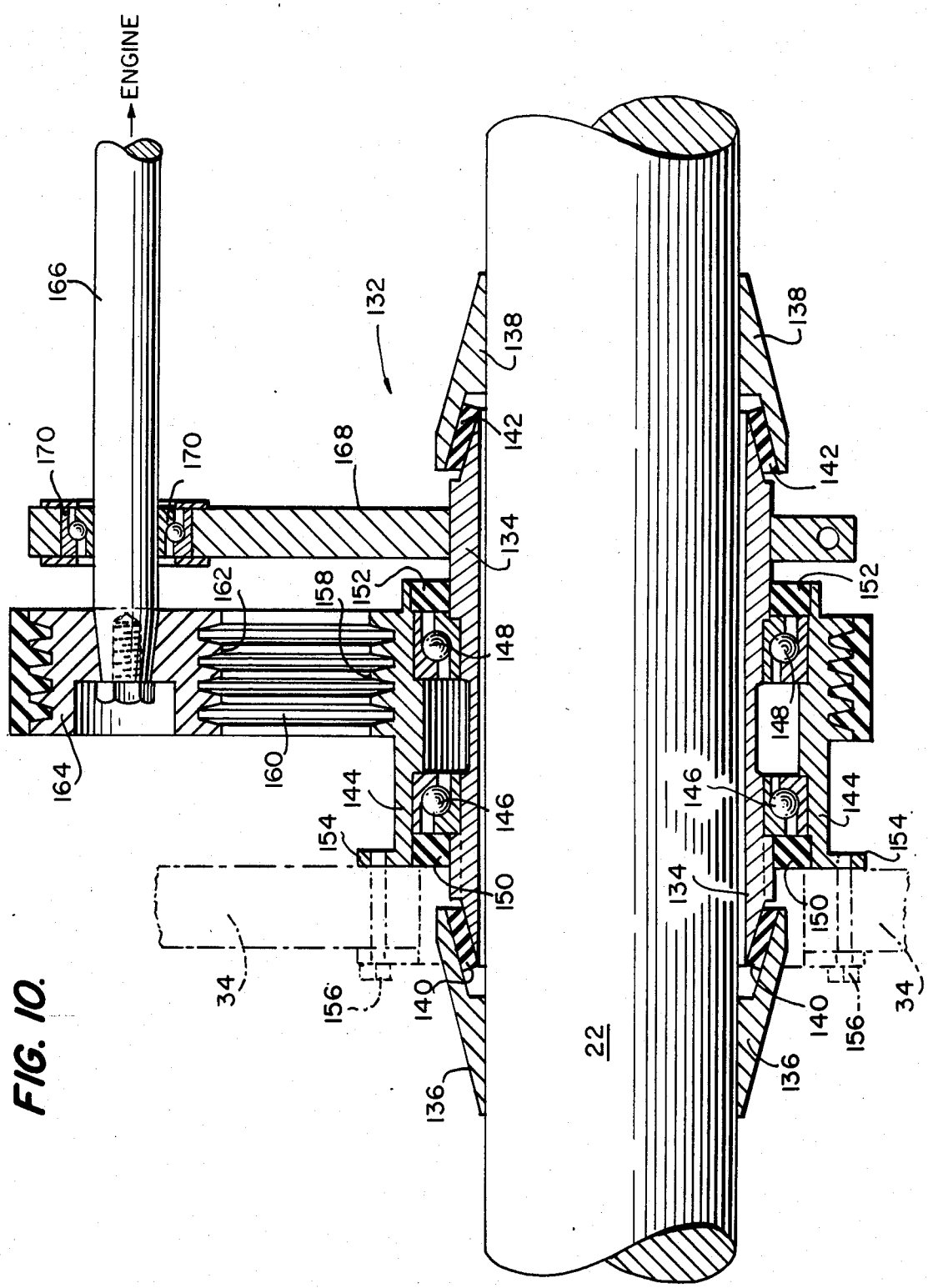
FIG. 10 is a cross-sectional view similar to FIG. 5 illustrating another embodiment of the mounting system of the present invention.

A variation to the previously-described propeller and engine mounting system is illustrated by the propeller mounting assembly shown generally at 132 in FIG. 10. The primary difference between system 36 and assembly 132 is that the engine is not mounted on the sleeve in assembly 132, but rather is mounted on a separate structure (not shown). Otherwise the functional concept is the same. A similar sleeve 134 is provided having an inner diameter slightly larger than the outer diameter of boom 22 so that when positioned about boom 22 and supported in its longitudinal position by opposed cups 136 and 138, sleeve 134 does not directly contact boom 22. Ring-shaped vibration dampening materials 140 and 142 are positioned between sleeve 134 and cups 136 and 138, respectively, and absorb vibrational forces from the sleeve so that they are not transmitted to the boom. Suitable threaded means can be provided so that the cups can be threaded relative to the sleeve and the desired compressions exerted on vibration dampening materials 140 and 142. A driver sleeve 144 is positioned around and spaced from sleeve 134. Driver sleeve 144 is rotatable about sleeve 134 on bearings 146, 148 which have suitable lubricant seals 150, 152 positioned between the sleeves. Driver sleeve 144 has a mounting flange 154 at one end to which propeller 34 is bolted by bolts 156, and a middle grooved portion 158. Grooved portion 158 engages a belt 160 or gear means which, by engaging similar grooves 162 on driver pulley 164, transfers the rotation from the engine drive shaft 166 to propeller 34. A bracket 168 for supporting drive shaft 166 and driver pulley 164 is mounted to sleeve 134 and extends out from the sleeve. Drive shaft 166 passes through an opening in bracket 168 and rotates on bearings 170 situated in the opening. It is also within the scope of the present invention though to support bracket 168 to boom 22 on structure (not shown) separate from sleeve 134. Thus, as the engine turns shaft 166, driver pulley 164 is rotated and this rotation is transferred to driver sleeve 144 by belt 160. As driver sleeve 144 rotates on its bearing 146, 148 about sleeve 134, propeller 34 mounted to driver sleeve 144 is thereby rotated concentrically about boom 22 and the aircraft is propelled.

From the foregoing detailed description it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An assembly for mounting a propeller, which is driven by an aircraft engine, on a longitudinal member of an aircraft comprising:
    a sleeve having first and second ends and positioned about said longitudinal member,
    a securing means for securing said sleeve relative to said longitudinal member so that said sleeve does not move longitudinally along said longitudinal member,
    said securing means including opposed first and second cups operatively attachable, respectively, to said first and second ends of said sleeve,
    a rotating means mounted to said propeller, rotatable about said sleeve, and driven by said engine for rotating saod propeller concentrically about a longitudinal axis of said longitudinal member, and
    a bearing means disposed between said rotating means and said sleeve and on which said rotating means rotates.

2. The assembly of claim 1 including,
    said rotating means including a driver sleeve rotatable about said sleeve on said bearing means, a propeller mounting means for mounting said propeller to said driver sleeve, a driver pulley driven by said engine, and a connecting means for drivingly connecting said driver pulley to said driver sleeve.

3. The assembly of claim 2 including,
    said propeller mounting means including a mounting flange attached to said driver sleeve and to which said propeller is secured.

4. The assembly of claim 2 including,
    a driver pulley mounting means for mounting said driver pulley in spaced relation to said driver sleeve.

5. The assembly of claim 4 including,
    said driver pulley mounting means further including a bracket mounted to said sleeve and supporting said driver pulley.

6. The assembly of claim 5 including,
    said rotating means further including a drive shaft driven by said engine, drivingly connected to said driver pulley, and supported by said bracket.

7. The assembly of claim 1 including,
    a vibration dampening means disposed between said sleeve and said longitudinal member for dampening the vibrations transmitted beween said sleeve and said longitudinal member.

8. The assembly of claim 1 including,
    a vibration dampening means positioned between said first cup and said first end and between said second cup and said second end.

9. The assembly of claim 1 including,
    said securing means supporting said sleeve a distance spaced from said longitudinal member whereby generally all of the vibrational force transmitted from said sleeve to said longitudinal member pass from said sleeve through said securing means to said longitudinal member.

10. The assembly of claim 9 including,
    said securing means including a vibration dampening means for dampening said vibrational forces.

11. The assembly of claim 1 including,
    said engine being mounted on structure separate from said sleeve.

12. The assembly of claim 1 including,
    said securing means including a flange member secured directly to said longitudinal member adjacent said first end, and an adjustable member mounted on said sleeve on said first end, and an adjusting means for adjusting the position of said adjustable member along said first end.

13. The assembly of claim 12 including,
    a vibration dampening means disposed between said securing means and said sleeve, and
    at least a portion of said vibration dampening means being positioned between said flange member and said adjustable member.

14. The assembly of claim 13 including,
    said adjustable means including matched threaded portions on said first end and on said adjustable member so that, as said adjustable member is screwed along said longitudinal member, said vibration dampening means is subjected to varying compressions.

15. The assembly of claim 13 including,
    said securing means further including a second flange member secured directly to said longitudinal member adjacent said second end, a second adjustable member mounted on said sleeve on said second end, and a second adjusting means for adjusting the position of said second adjustable member along said second end, and
    at least a portion of said vibration dampening means being disposed between said second flange member and said second adjustable member.

16. The assembly of claim 1 including,
    said first and second cups being attached to said longitudinal member.

17. The assembly of claim 1 including,
    said sleeve being dimensioned to fit snugly against and around said longitudinal member.

18. The assembly of claim 1 including,
    a structural member separate from said sleeve and to which said engine is mounted.

19. An assembly for mounting a propeller, which is driven by an aircraft engine, on a longitudinal member of an aircraft comprising:
    a sleeve having first and second ends and positioned about said longitudinal member,
    a securing means for securing said sleeve relative to said longitudinal member so that said sleeve does not move longitudinally along said longitudinal member,
    a rotating means mounted to said propeller, rotatable about said sleeve, and driven by said engine for rotating said propeller concentrically about a longitudinal axis of said longitudinal member,
    a bearing means disposed between said rotating means and said sleeve and on which said rotating means rotates,
    said rotating means including a driver sleeve rotatable about said sleeve on said bearing means, a propeller mounting means for mounting said propeller to said driver sleeve, a driver pulley driven by said engine, and a connecting means for drivingly connecting said driver pulley to said driver sleeve,
    a driver pulley mounting means for mounting said driver pulley in spaced relation to said driver sleeve, said driver pulley mounting means including a bracket mounted to said sleeve and supporting said driver pulley, said securing means including opposed first and second cups attachable to said sleeve and to said first and second ends, respectively, of said sleeve, and a vibration dampening means positioned between said first cup and said first end and between said second cup and said second end.

20. The assembly of claim 19 including,
said securing means supporting said sleeve a distance spaced from said longitudinal member whereby generally all of the vibrational forces transmitted from said sleeve to said longitudinal member pass from said sleeve through said securing means and said vibration dampening means to said longitudinal member.

21. The assembly of claim 19 including,
said rotating means further including a drive shaft driven by said engine, drivingly connected to said driver pulley, and supported by said bracket.

* * * * *